Dec. 4, 1928.
J. GAGE
1,693,893
AUTOMATIC INTERMITTENT EXHIBITING DEVICE
Filed May 16, 1923      5 Sheets-Sheet 4
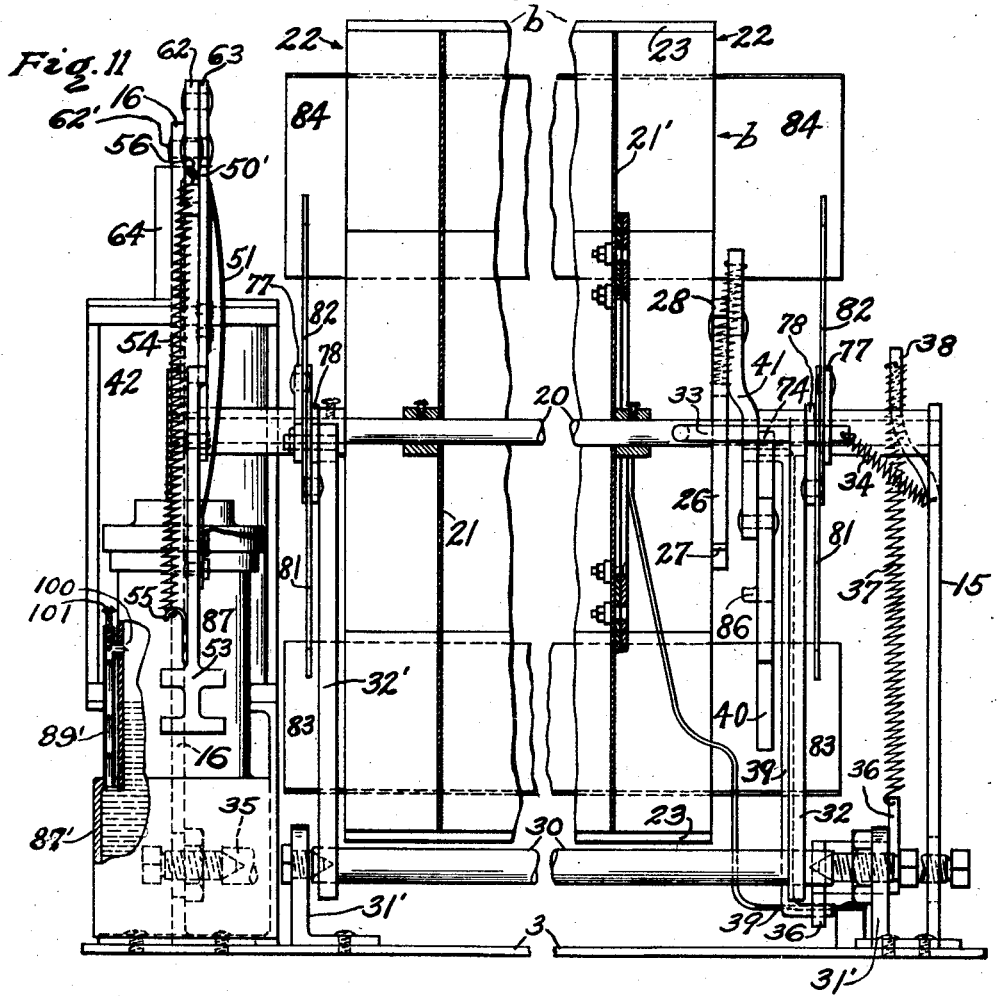
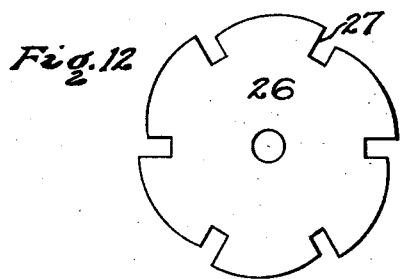
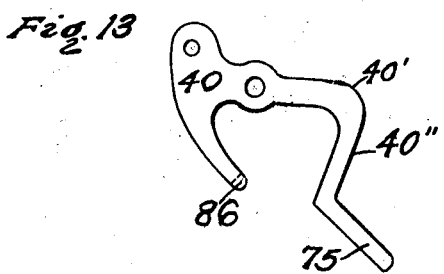
WITNESS:
J. A. McDowell
INVENTOR
JAY GAGE
by James R. Towner
his atty

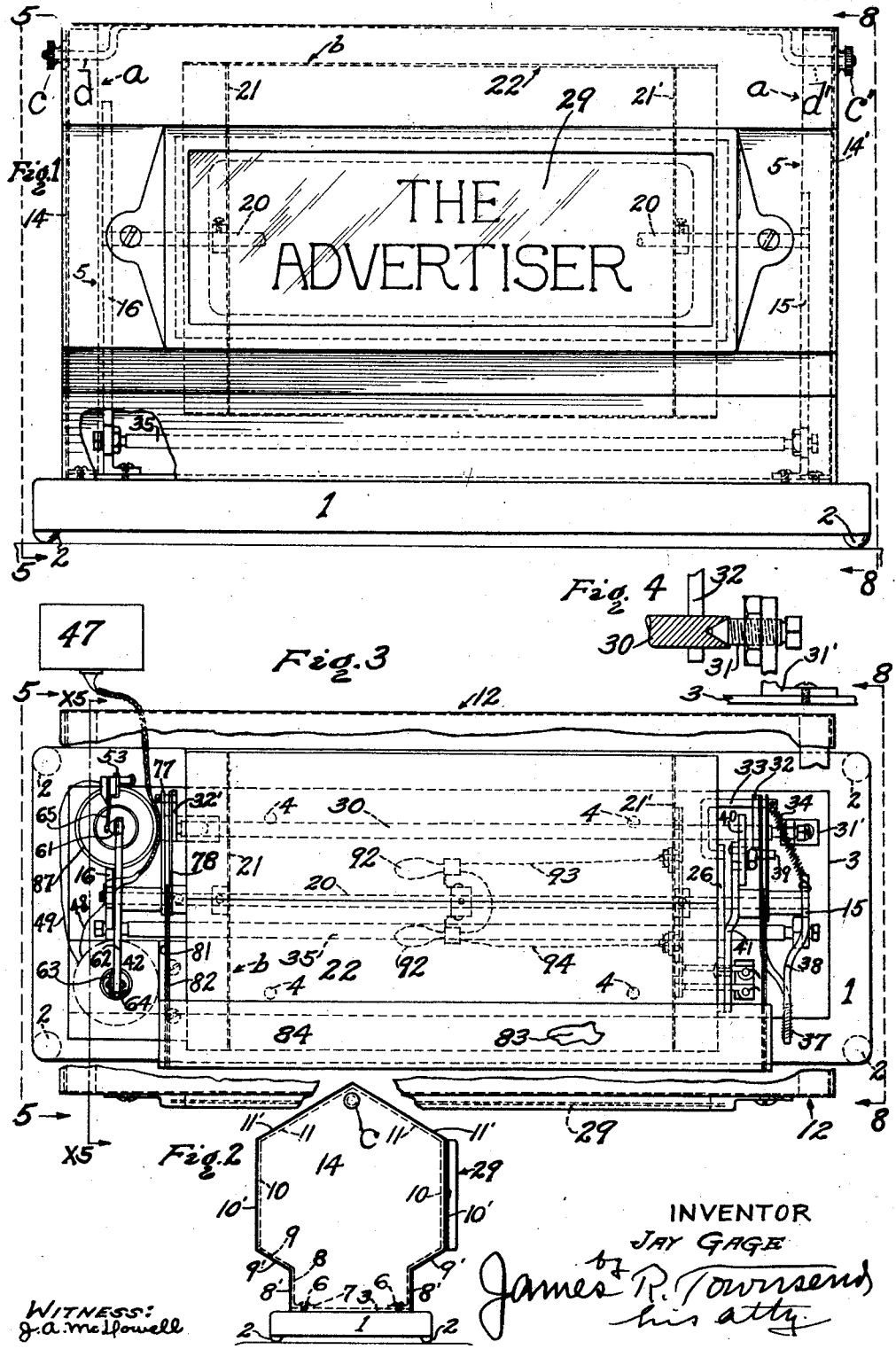

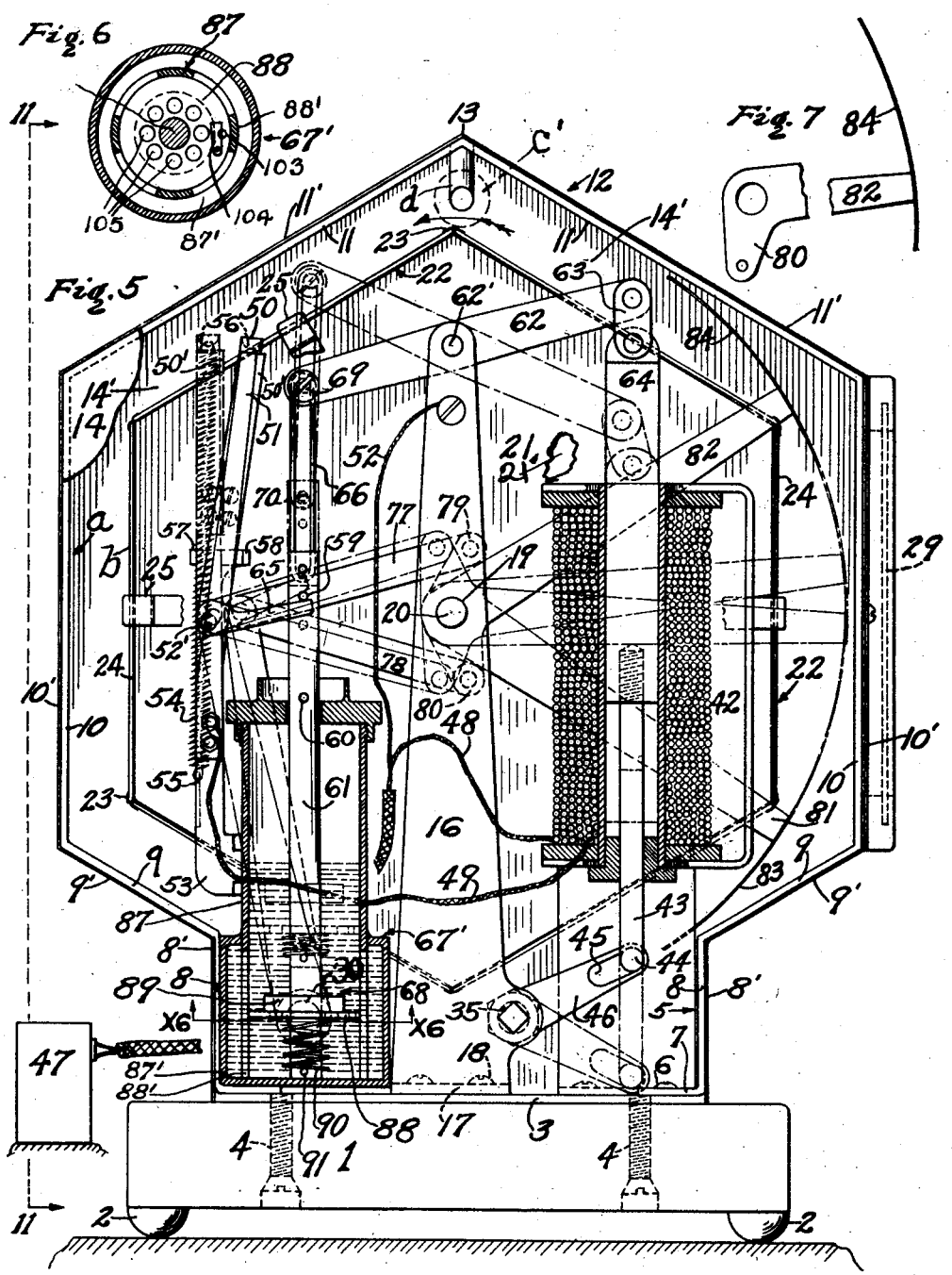

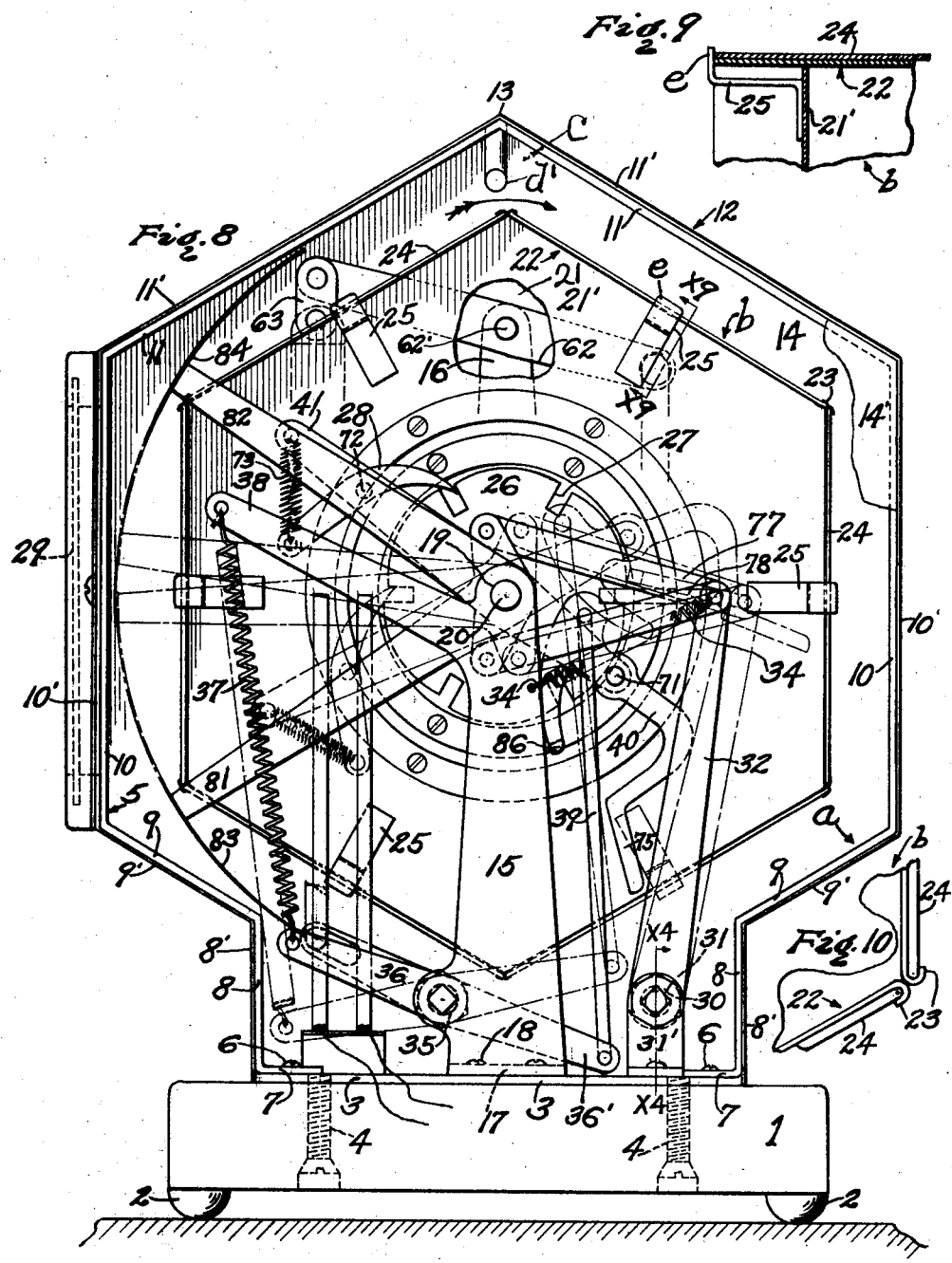

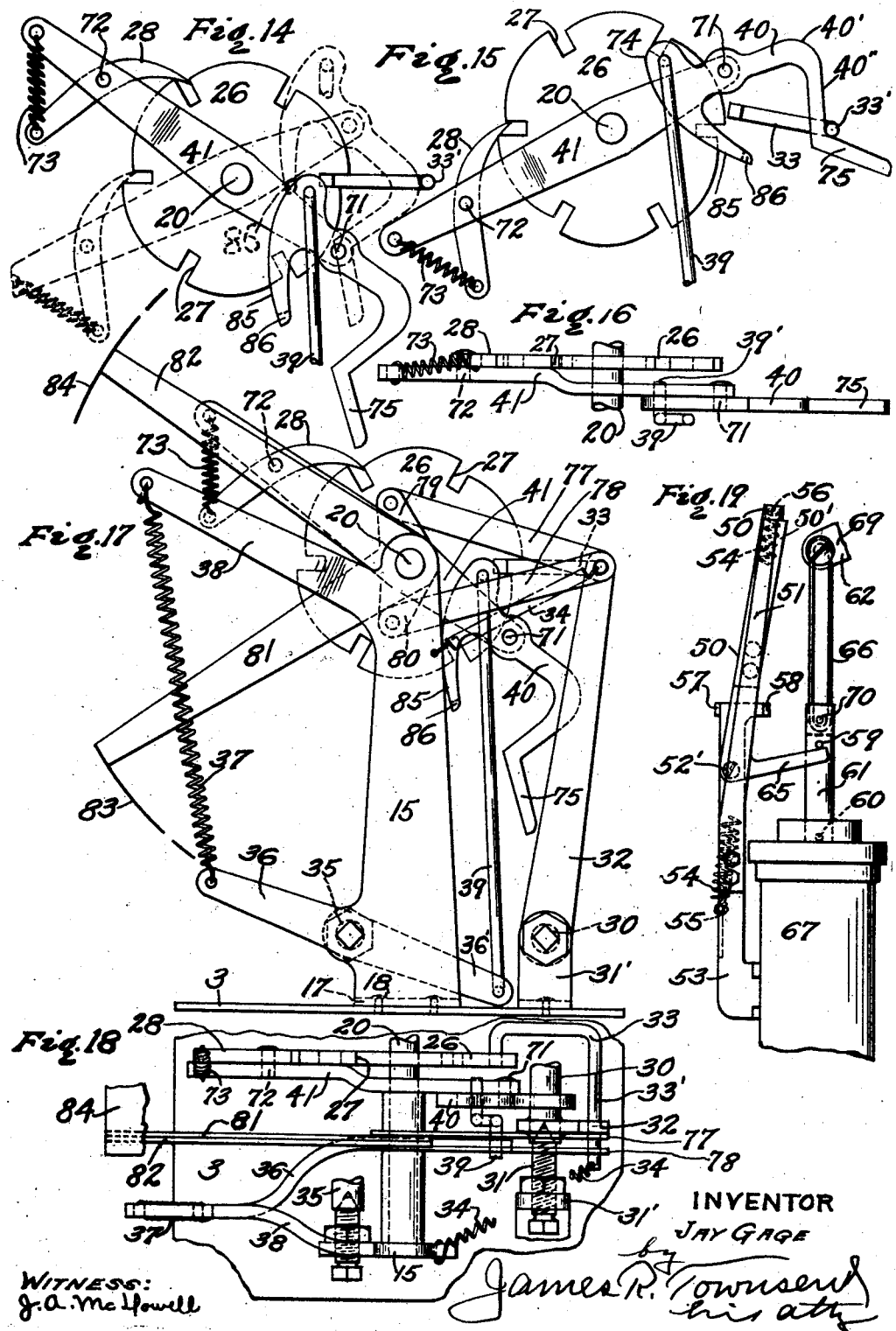

Patented Dec. 4, 1928.

1,693,893

UNITED STATES PATENT OFFICE.

JAY GAGE, OF LOS ANGELES, CALIFORNIA, ASSIGNOR, BY DIRECT AND MESNE ASSIGNMENTS, TO ELECTRO-TEL-IT MANUFACTURING COMPANY.

AUTOMATIC INTERMITTENT-EXHIBITING DEVICE.

Application filed May 16, 1923. Serial No. 639,341.

An object of this invention is to provide a novel advertising device operable by an electric current to display advertisements successively and that is compact so as to be adapted to be placed in show windows, on the top of automatic weighing scales, and in other prominent public places where economy of space is desirable.

Cheapness, simplicity and lightness are other objects.

The device is constructed with a polygonal advertisement carrier and polygonal case, one of the sides of which case is provided with a sight panel or transparency through which the faces of the polygonal advertisement carrier can be viewed successively as the carrier is revolved, and I provide means whereby the polygonal carrier is revolved intermittently step by step and whereby shutter means will be operated to open and close the sight opening; said shutter means being interposed between said sight opening and the carrier whenever the carrier is revolving, thus to attract attention and arouse the interest of passers-by.

An object of this invention is to provide an attractive, flashing contrivance which can be placed on the top of a weighing machine and which will attract attention to said machine not only for the purpose of advertising commodities but also of advertising the weighing machine itself, thus to cause patronage thereof.

An object is to make provision whereby the interior mechanism of the device may be readily reached by an attendant for adjustment or repair.

An object of the invention is to provide for operating the device electromagnetically and yet to avoid destructive application of force to the mechanism. I accomplish this object by applying the force of the electro-magnet to place a spring under tension and then apply the force of said spring to operate the mechanism.

I provide in combination with an electrical switch, a dash pot timing mechanism, a lost motion device between such mechanism and a spring returned electro-magnetically operated actuating device, so that such actuating device can be immediately re-set by the spring the moment the current is turned off, and the dash pot is left free to control the spring operated switch.

An object of the invention is to provide simple accurate means for timing the revolving of the exhibiting frame of the exhibiting device; and in this connection, I provide means whereby, when the current is shut off from the actuated electro-magnetic element of the device said element is free to immediately return to the starting point.

An object is to prevent arcing; and I attain this object by the combination with an easily operated snap action spring of an electrically retracted dash pot plunger, which is arranged to set off the snap action contact mechanism; and the dash pot plunger is constructed and arranged to travel slowly for a predetermined period and then to operate suddenly to set off the contact closing device.

The electromagnetically operated device may be the plunger of a solenoid, or an armature and it is understood that reference herein to a solenoid or solenoid plunger is intended to include any equivalent thereof.

Other objects, advantages and features of invention may appear from the accompanying drawings, the subjoined detail description and the appended claims.

The accompanying drawings illustrate the invention.

Figure 1 is a front elevation of an exhibiting device constructed in accordance with this invention, and standing on a support which may be the frame of a weighing machine, the floor of a show window or any other desired support. Broken lines indicate the location of some of the interior parts and a portion of the case is broken out to expose a part of the frame.

Fig. 2 is an end elevation of the same in reduced scale.

Fig. 3 is a plan of the device on the scale of Fig. 1; the upper portions of the case being broken away to expose some of the interior construction.

Fig. 4 is a fragmental elevational detail partly in vertical section on line $x^4$, Fig. 8, illustrating the pivotal rock shaft support.

Fig. 5 is a fragmental end elevation viewed from a plane indicated by line 5—5 at the left of Figs. 1 and 3, and showing on a larger scale the actuating and timing mechanisms of the apparatus broken and sectioned on line $x^5$ in Fig. 3 to show the solenoid, plunger and switch.

Fig. 6 is a horizontal section on line $x^6$, Fig. 5, looking up.

Fig. 7 is a detached fragmental view of one of the shutter arms.

Fig. 8 is a fragmental end elevation on the scale of Fig. 5 and viewed from a plane indicated by line 8—8 at the right of Figs. 1 and 3 showing the main spring and the mechanism operated thereby in position with the shutter retracted in full lines, and closed in dot and dash lines; and also showing electrical contacts for the lights.

Fig. 9 is a fragmental section on line $x^9$, Fig. 8, showing one of the end stops for the advertising cards.

Fig. 10 is an enlarged fragmental end elevation of a corner of the drum with advertising cards therein.

Fig. 11 is a fragmental side elevation of the operative parts partly in section to expose interior construction.

Fig. 12 is a detail of the ratchet wheel.

Fig. 13 is a detail of the rocker arm.

Fig. 14 is a side elevation of the assembly of the ratchet wheel mechanism showing the pawl and rocker arm at rest.

Fig. 15 is a side elevation of the assembly of the ratchet wheel mechanism showing the pawl advanced to the next notch beyond that caught by it in Fig. 14 and rocker arm in kicking out position.

Fig. 16 is a plan view of Fig. 15 looking from the underside.

Fig. 17 is a side elevation showing the assembly of the ratchet wheel mechanism and shutter mechanism, and showing the shutter in open position.

Fig. 18 is a plan view of Fig. 17 looking down from the top.

Fig. 19 is a fragmental detail showing the switch assembly and showing the switch in contact position; fragments of the switch spring are indicated in broken lines.

The device may be variously constructed and is illustrated with an exhibiting frame and operating mechanism mounted inside a case or housing $a$.

The base 1 of the case is shown supported on base feet 2, which may be of rubber or any other desirable material, and the bottom plate 3 of the housing frame is secured to the base 1 by screws 4 inserted up through the base 1 and screwed into the bottom plate 3, which extends from end to end of the housing frame and to which the uprights 5 of the housing frame are fixed by suitable means as the screws 6.

The uprights 5 of said frame are metal strips at the ends of said frame; each bent to form on opposite sides of a vertical longitudinal mid-plane, the feet 7, legs 8, slanting lateral limbs 9, upright side limbs 10 and slanting top limbs 11 of the case. The limbs 9, 10 and 11 conform to sides of a polygonal figure, which in the present instance is hexagonal to house a hexagonal revolving exhibiting frame $b$. The legs 8 of each upright are spaced apart the width of one side of said figure.

There is one of said uprights at each end of the bottom plate 3, and said uprights support the housing shell 12, which is of sheet metal and is preferably of a single piece bent to provide the members 8', 9', 10' and 11' on each side of a vertical longitudinal plane produced from the peak 13 formed by the top members 11 of the frame uprights and 11' of the shell. The ends of the housing are closed by removable end pieces 14, 14'; which are shown fitted inside the shell and against the uprights 5 and held in place by nuts $c, c'$ on studs $d, d'$ fixed to the housing.

Inside the frame and its housing, rigid end posts 15, 16 preferably in the form of sheet metal stampings, are mounted transversely of the housing and provided respectively with bottom flanges 17 forming feet secured by means of screws 18 to the base plate 3, and provided with bearings 19 by means of which a horizontal exhibiting frame shaft 20, extending lengthwise of the housing and journaled to revolve in said bearings, is mounted centrally of the case. The exhibiting frame $b$ is fixed to and is revolved by said shaft 20 and may be made of sheet metal; and it comprises end pieces 21, 21' fixed to and revolving with the shaft 20, and card holders 22 fixed to and connecting the end pieces. In the form shown the exhibiting frame is hexagonal and is of such cross sectional dimensions as to be freely revolvable inside the case.

The card holders 22 of the frame $b$, are suitably fixed, as by solder, to the end pieces 21, 21' and are provided at their longitudinal edges with retainers 23 for advertising cards 24. Said retainers are shown as bent up edges of the sheets forming the card holders and said retainers form slide-ways into which the cards may be slid from either end.

The card holders 22 preferably extend beyond the end pieces 21, 21'. Spring stops 25 are secured to the outer faces of the end pieces 21, 21' and have upward bends $e$ projecting beyond the ends of the card holders, and adapted to be sprung inwardly out of the way to allow advertising cards 24, to be inserted into and withdrawn from the slide-way between the retainers. The stops prevent the cards from being accidentally slid out endwise.

An escapement wheel 26 having notches 27 to receive the operating pawl 28, is fixed to and turns the horizontal shaft 20 and said exhibiting frame $b$; and is intermittently actuated by electro-magnetic means and connections which may be of any desired character adapted to revolve the exhibiting frame step by step, with intervals of rest, as said cards come successively to vertical position at the sight panel opening or transparency 29 in the front side of the case.

Preferably the exhibiting frame *b* is located centrally of the housing, and the operating mechanism is made in two sections stored respectively in opposite ends of the housing and with the exhibiting frame between them, so as to give symmetry and balance to the device.

30 is a rock-shaft arranged below and out of the way of the exhibiting frame, and pivoted by adjustable pivots 31 to suitable supports 31' and provided with an elongate upwardly extending rock-arm 32 which is fixed to shaft 30, and oscillates a lock pin 33 that is adapted to lock and to release the escapement wheel.

To one end of the lock pin 33 there is connected one end of a helical spring 34 the other end of which is connected to the standard 15, to retract the lock pin 33 which is adapted and arranged to fit into the notches 27 of the ratchet wheel 26, thus normally holding the exhibiting frame *b* stationary, and allowing said frame to be turned only when the pin is withdrawn from wheel 26.

35 is a power transmitting rock shaft journalled to post 16 at one end, and to post 15 at the other end, and provided on one side with a rock arm 36, which is connected by the main spring 37 with a stationary part such as the arm 38 of the post 15; the rock shaft 35 is provided on its other side with an arm 36' that is connected by a rod 39 to a dog 40 which is pivoted on the pawl carrying member 41 that is journaled on the shaft 20 to which the escapement wheel 26 is fixed.

Power is applied to the power transmitting rock-shaft 35 from the solenoid 42 through the plunger rod 43 which acts through a pin 44 operating in slot 45 of the slotted rocker arm 46 that is fixed to, and rocks the shaft 35; and said solenoid is energized by a current from a suitable source, as the battery 47, through leads 48, 49, oscillating switch member 50 and its contact element 50' and the stationary ground contact 51 which contact is electrically connected through the frame at post 16 with the ground wire 52.

The oscillating switch member 50 is pivoted as at 52' to a stationary part as a standard 53 of the main frame, and is oscillated over the pivot center 52' by an oscillating spring 54 fixed to the standard at a point 55 below the pivot center 52', and to the oscillating switch member 50, at a point 56 above said pivot center 52'. Said standard 53 is provided with lateral stops 57, 58 against which the oscillating spring alternately brings the oscillating switch to rest according to the side of the pivot on which the axis of the spring lies. The amplitude of oscillation allowed by the stops 57, 58 is but little more than enough to cause the line of force of the spring between the points 55, 56 to pass the axis of the pivot 52' at the beginning of the oscillation in either direction and to permit the member 50 to be moved into and out of engagement with the ground contact 51 and thereby close and open the circuit to the solenoid 42. Means operable by the electro-magnetic device, as the solenoid 42, is provided in the form of lugs 59, 60 that are spaced apart on a dash pot plunger rod 61 operated by walking beam 62 that is pivoted to post 16 at 62' and has one end connected by a link 63 with the plunger 64 of the solenoid 42 and has its other end connected by a lost motion connection, to operate the oscillating switch 50 through an arm 65. Said lost motion connection comprises an elongated lost motion link 66 for lifting the dash pot plunger; and the lugs 59, 60 are fixed to the piston rod 61 of the dash pot 67', the piston 68 of which is constructed and arranged to offer a variable resistance to the descent of said rod 61 by a means to be further described. The connection between the walking beam 62 and the rod 61 is a lost motion connection and is preferably constructed with an elongated link or slotted member 66 which is shown as made of a steel wire or rod carried by a pin 69 on the walking beam 62, and acts upon a bearing 70 on the end of the rod 61' to lift such rod when the solenoid plunger descends; and it is given freedom for descent of the piston rod when the solenoid plunger is elevated as shown in Fig. 5 and further indicated in Fig. 19.

The rod 39 is pivoted to the dog 40 which in turn is pivoted by pivot 71 on the pawl carrying member 41 to which the pawl 28 is pivoted by a pivot 72; and said pawl is held by spring 73 in contact with the notched perimeter of the escapement wheel 26. The pivoted dog 40 is provided on one side of the pivot 71 with a head 74 to which the rod 39 is pivoted; and is provided on the other side of the pivot 71 with an angle arm 75 adapted to act upon the lock pin 33 to withdraw it from the escapement wheel 26.

The lock pin 33 has a straight limb 33' which extends through the elongated rock arm 32 due to the tendency of the spring 34 to draw said lock arm toward the escapement wheel into which the lock rod 33 enters to hold the escapement wheel from rotating. Said pin also passes through two connecting rods 77, 78 which are respectively connected by bell-cranks 79, 80 with shutter arms 81, 82 of the shutters 83, 84. Said shutter arms are arranged to extend aslant from the shaft 20; the bell-crank 79 of the arm 81 being above and the arm 81 below the level of said shaft 20 and the bell-crank arm 80 being below and shutter arm 82 being above said level so that as the rocker arm 32 moves toward the escapement wheel the arm 81 is moved down and the shutter arm 82 is moved up. Said shutter arms are provided with shutters 83, 84 respectively adapted to close together in front of the transparency 29 when the main spring 37 is operating pawl 28 to revolve the escapement wheel 26.

By reference to Fig. 17 it will be seen that when the main spring 37 is contracted, the lock pin 33 is in a notch 27 and holds the escapement wheel 26 and consequently the exhibiting frame b from revolving and when the rock shaft 35 is locked by a depression of the solenoid plunger 64 to expand the spring 37 the rod 39 is moved upward to retract the pawl from one notch 27 to a lower notch.

During this movement the connecting rod 39 depresses the angle arm 75 so that the bent intermediate portion thereof escapes the portion 33' of the lock bar until the angle arm 75 engages the underside of said portion 33'.

When the lock pin 33 is withdrawn as shown in solid lines Fig. 17 and in broken lines Fig. 8 the main spring 37 is left free to rock the shaft 35 in the direction reverse to that in which it is actuated by the solenoid; and the downward movement of the arm 36' pulls down the connecting rod 39 and moves the dog 40, into the position shown in Fig. 17, thus operating the pawl 28 to turn the escapement wheel.

The portions of the escapement wheel between the notches 27 is radially reduced just forwardly of such notches so that the lock pin easily intercepts the escapement wheel to stop the exhibiting frame at the appropriate point.

The arm 40 is provided with a rounded bend 40' and a lock bar retracting limb 40" and when the dog 40 is lifted the bend 40' and retracting arm 40" act upon the portion 33' of the lock pin 33 thus to retract said lock pin and the arm 32 which in turn rocks the rock shaft 30. The head 74 of the dog 40 is provided below the level of its pivot 71 with an extension 85 terminating in a lug 86 to catch under the arm 41 when the rod 39 is at its highest upward movement. It is adapted to bring the connecting rod 39 across the pivot 71 which position is such as to allow the intermediate portion 40' and 40" of the dog to come below the level of the portion 33' of the lock pin.

As the connecting rod 39 moves from the position shown in solid lines in Fig. 14 to its highest position which is shown in broken lines in said Fig. 14, the bend 40' of the dog 40 is held retracted until it has passed the portion 33' of the lock pin 33 and when the dog has reached its highest position and has forced the lock pin out of contact, as shown in Fig. 15, the spring 37 retracts the dog to the position shown in solid lines in Fig. 15. Immediately the lock pin 33 is withdrawn the spring 37 operating through the arm 36' connecting rod 39, dog 40 and arm 41, operates the pawl 28 to turn the escapement wheel. The upper end 39' of the connecting rod 39 extends through the head 74 of the dog sufficiently far to contact with the upper side of the pawl carrying arm 41 so that the action of the spring through 36, 36' and 39 is directly applied as indicated in solid lines in Fig. 14 to oscillate the pawl carrying arm 41.

The dash pot is constructed with a straight cylindrical upper portion 87 and an enlarged bottom portion 87'. The washer 88 is of the same diameter as the cylindrical upper portion 87, and guides 88' extend from the bottom of the dash pot to the cylindrical portion 87 to guide said washer. A by-pass 89' extends from the enlarged portion 87' to adjacent the upper end of the cylindrical portion 87, said by-pass entering the chamber 87 through a port 100.

A screw 101 is threaded into the by-pass 89' and is adapted to extend over the port 100 to vary the opening of said port, and thus limit the amount of fluid passing through said port.

A port 103 is formed in the washer 88 through which fluid is adapted to pass as the plunger reciprocates, and this port may be adjusted by a plate 104 pivoted to the washer 88 and adapted to swing over said port to partially close the same.

The operation of the dash pot is as follows:—

With the parts shown in solid line position, Fig. 5, the switch 50 has just been closed by virtue of its element 50' contacting with the ground contact 51 upon the forward movement of said switch on its pivot 52', which energizes the solenoid 42 causing the plunger 64 thereof to move downwardly, which pulls the plunger 61 upwardly through the operation of the walking beam 62. The resistance of the fluid in the dash pot to the upward movement of the washer 88 causes said washer to move downwardly against the tension of the spring 90, thus exposing ports 105 in said washer, which normally are covered by the top washer 89.

The opening of these ports permits the fluid to pass the washer 88 more readily and facilitates the upward movement of the rod 61. The upward movement of the rod 61 rocks the switch rearwardly to break the connection between contact element 50' and the ground contact 51, which de-energizes the solenoid 42 and the weight of the rod 61, and washers 89 and 88 cause said plunger and parts to move downwardly in the dash pot forcing the liquid through the by-pass 89' into the section 87.

Previous to this downward movement, however, the spring 90 has moved the washer 88 upwardly against the washer 89, thus closing the ports 105, which ports remain closed during the downward movement of the rod and washers.

As the liquid passes into the section 87, the weight thereof assists in the downward movement of the washers. When the washer 88 arrives in the enlarged portion 87' the resistance of the fluid is removed therefrom because of the space around said washer, and the rod 61 falls rapidly to the bottom of the dash pot to again close the switch 50 to energize the solenoid 42. The bottom washer 88 of the plunger head is made of metal and is held against the top washer 89 of said plunger head by a spring 90 which is held on the lower end of the plunger shaft 61 by pin 91.

The rock shaft 30 extends in parallelism with the shafts 20 and 35 and is provided beyond the ends of the carrier with the rock arms 32 and 32', both of which are connected in the manner detailed in Figs. 8, 17 and 18 to operate the shutters each time the shaft 30 is rocked.

The lamps 92 are connected with the electric source through leads 93, 94 and are constantly lighted; but at each closing of the shutters the lights will be hidden and as the shutters are again opened will illuminate the signs.

The operation of my device will be apparent from the foregoing description.

I claim:

1. An exhibiting device comprising a carrier for advertisements; electrically operated means for intermittently operating the carrier to successively expose to view advertisements on the carrier; an electrical switch connected to said operating means; dash pot means connected to operate said switch; a piston rod in said dash pot and an elongate slotted link and pins on said piston rod, said link and pins cooperating to form lost motion means for timing the periods of the operation of said switch by the dash pot.

2. In combination with an advertisement carrier, means to rotate said carrier means, a walking beam; a solenoid having a plunger rod connected to one end of the walking beam; a link connected to the other end of said walking beam; a dash pot; a plunger operable with variable motion in said dash pot and connected to said link; an electrical switch; and means on the dash pot plunger for operating the switch to energize and deenergize the solenoid for operating the carrier operating means intermittently.

3. The combination with an advertisement carrier, of means to intermittently operate said carrier, a spring, and rock arms operable in one direction by said spring, of an escapement connected to said carrier for regulating the intermittent operation thereof; means to lock the escapement; a dog operable by said spring through the rock arms, and adapted to unlock the escapement.

4. The combination with an advertisement carrier, of means to operate said carrier intermittently, a spring, and rock arms operable in one direction by said spring, of an escapement connected to said carrier for regulating the intermittent operation thereof; means to lock the escapement; a dog operable by said spring through the rock arms, and adapted to unlock the escapement; shutters to exclude the advertisement from view, and means operable by said spring and connected to operate the shutters.

5. In combination with a polygonal case having a transparency in one of its sides; a polygonal advertisement carrier arranged inside the case; electro-magnetic means and dash pot means inside the case at one end of the carrier; means inside the case at the other end of the carrier for revolving the carrier step by step to successively expose its faces through the transparency; said means including a spring for operating the carrier; means connecting said spring to the electromagnetic means to put the spring under tension; and means operable by the dash pot means to close the contact for the purpose of energizing the magnet of said electro-magnetic means to thereby place the spring under tension.

6. In an apparatus for intermittently revolving a carrier; a spring operated escapement wheel connected to said carrier and provided with notches; a lever fulcrumed axially of said escapement wheel; a pawl at one end of said lever; a spring adapted to hold the pawl in engagement with said escapement wheel; a dog pivoted to the other end of said lever, and provided with a downward extension having a lug to engage the underside of said lever when the head of the dog is elevated; spring operated means to swing said dog on its pivots; a lock pin adapted to enter the notches of the escapement wheel; yielding means to hold the lock pin in engagement with the notches; said dog being provided with an extension adapted to operate with a cam action upon the lock pin to withdraw it from the escapement wheel, and also provided with an arm to act as a stop for said extension so that when the dog is operated it will act with the cam to force the lock pin out of engagement, and will then come to rest so that operation of the dog will operate the lever; and the pawl carried thereby will revolve the escapement wheel.

In testimony whereof, I have hereunto set my hand at Los Angeles, California, this 10th day of May, 1923.

JAY GAGE.